United States Patent
Bloemendaal

(10) Patent No.: US 8,876,031 B2
(45) Date of Patent: Nov. 4, 2014

(54) FISHING REEL WITH DUAL SPOOL SPIN AXES

(76) Inventor: Brent J. Bloemendaal, Zionsville, IN (US)

( * ) Notice: Subject to any disclaimer, the term of this patent is extended or adjusted under 35 U.S.C. 154(b) by 768 days.

(21) Appl. No.: 12/932,676

(22) Filed: Mar. 3, 2011

(65) Prior Publication Data

US 2012/0001007 A1 Jan. 5, 2012

Related U.S. Application Data

(60) Provisional application No. 61/398,806, filed on Jul. 1, 2010.

(51) Int. Cl.
*A01K 89/01* (2006.01)
*A01K 89/06* (2006.01)

(52) U.S. Cl.
CPC ....................................... *A01K 89/06* (2013.01)
USPC ............................ 242/229; 242/321; 242/286

(58) Field of Classification Search
USPC .................................. 242/229, 321, 285, 286
See application file for complete search history.

(56) References Cited

U.S. PATENT DOCUMENTS

| | | | | |
|---|---|---|---|---|
| 2,612,325 A | * | 9/1952 | Johnson | 242/229 |
| 2,708,077 A | * | 5/1955 | Dalzell et al. | 242/229 |
| 2,749,057 A | * | 6/1956 | Jenkins et al. | 242/229 |
| 2,941,748 A | * | 6/1960 | Matthiesen | 242/229 |
| 3,034,604 A | | 5/1962 | Holmes | |
| 3,039,716 A | * | 6/1962 | Visockis | 242/229 |
| 3,384,320 A | * | 5/1968 | Hawk | 242/229 |
| 3,711,036 A | * | 1/1973 | Spraggins | 242/234 |
| 3,944,159 A | * | 3/1976 | Dobbs | 242/229 |
| 5,120,003 A | | 6/1992 | Sacconi | |
| 5,755,391 A | | 5/1998 | Sacconi | |
| 6,065,699 A | * | 5/2000 | Sacconi | 242/286 |
| 6,412,720 B1 | | 7/2002 | Ikuta | |
| 6,561,448 B2 | * | 5/2003 | Barker | 242/229 |

* cited by examiner

*Primary Examiner* — Emmanuel M Marcelo
(74) *Attorney, Agent, or Firm* — John C. McMahon

(57) ABSTRACT

A fishing reel with dual spool spin axes includes a housing, a rotor assembly rotatably mounted on the housing, and a spool shroud assembly including a fishing line spool gimbal mounted on the rotor assembly. The shroud assembly is movable between a casting position with a spool axis parallel to a rod axis and a retrieve position with the spool axis perpendicular to the rod axis. The spool is geared to the housing in such a manner that rotation of the rotor assembly about a rotor axis to retrieve the line causes the spool to spin about the rotor axis and simultaneously about a spool axis to counteract twist in the line caused by the manner of casting the line or by line pay-out by a hooked fish.

28 Claims, 3 Drawing Sheets

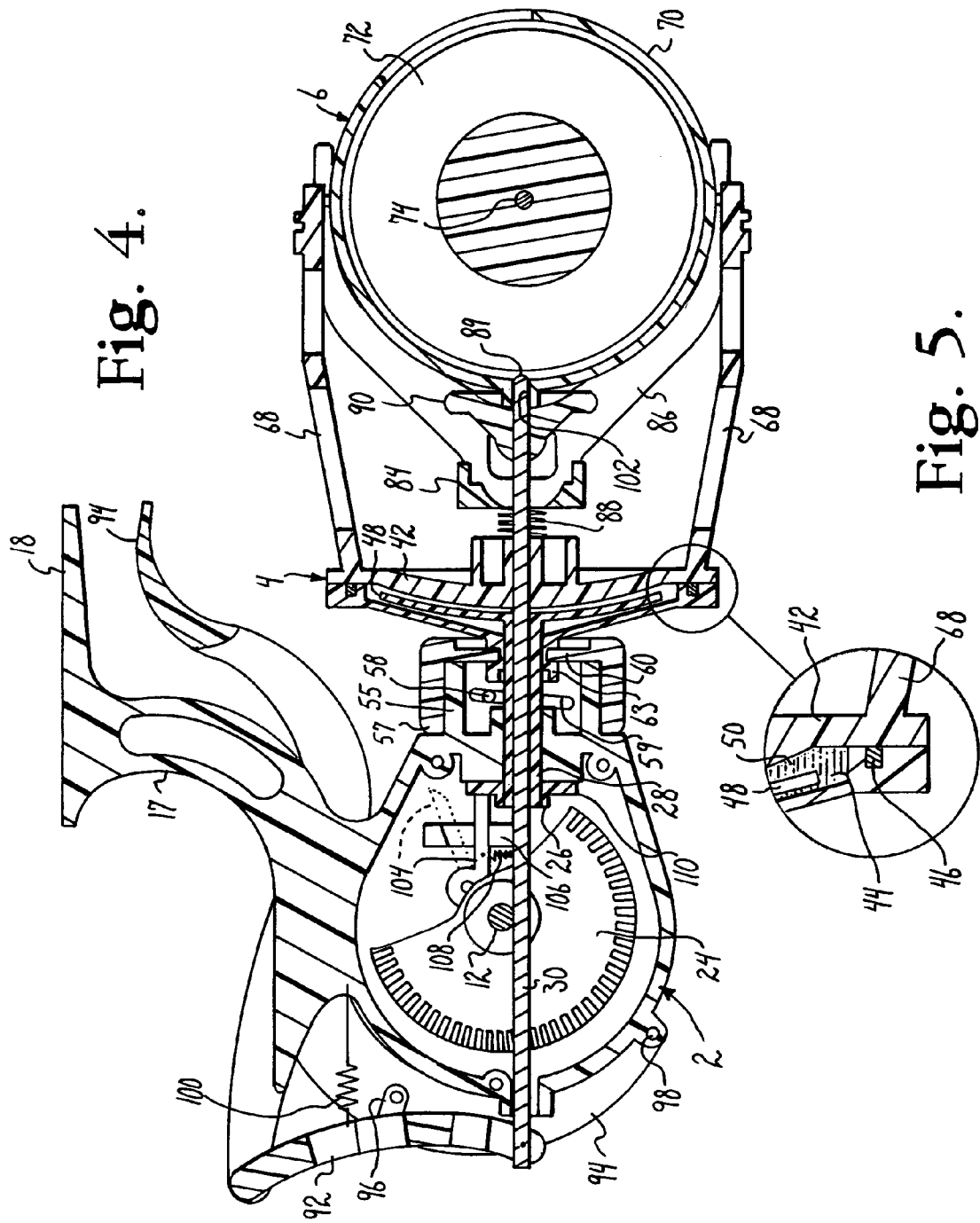

FISHING REEL WITH DUAL SPOOL SPIN AXES

BACKGROUND OF THE INVENTION

The present invention is broadly concerned with improvements in fishing reels and, more particularly, to a fishing reel with a fishing line spool which is rotated about a two axes to simultaneously wrap fishing line onto the reel and counteract twist in the line resulting from casting a lure tied to the end of the line.

Conventional fishing reels are generally classified as fly reels or fly casting reels, casting or bait casting reels, spinning reels, and spin cast reels, depending on their configuration. The various types of reels share certain characteristics: they include spools which store fishing line which can be payed out, either manually or by casting, or retrieved by turning a crank which is engaged with the spool. Additionally many types of reels incorporate some type of adjustable drag mechanism which functions to retard the pay-out of the line from the spool by a hooked fish, to tire the fish out to thereby facilitate landing the fish.

Fly reels tend to be the simplest reel configuration. Typically, a fisherman pulls a length of line from the real, and a fly lure is cast to the area to be fished to simulate the flying action of an insect, taking up the slack of the manually pulled out line. Thus, the reel usually does not affect the casting action. Bait casting or baitcasting reels are somewhat more complex than fly reels and typically incorporate some kind of drag adjustment and a laterally oscillating line guide to wrap the line on the spool in an orderly manner when the line is retrieved. When bait casting reels are used in casting, the inertia and friction of the spool limit the casting distance to some extent for a given weight of lure. Another spool inertia problem with bait casting reels is a tendency of the spool to continue spinning after the lure lands in the water, resulting in a condition referred to as backlash or "bird's nest" in which a quantity of line is fed off the spool into a tangled mass within the reel. Reels for fishing large marine fish tend to be upscaled bait casting reels. Fly reels and bait casting reels employ spools rotating about transverse axes, with fly reels mounted below the rod and bait casting reels mounted above the rod.

Spinning reels were originally developed to allow the casting of artificial flies which were too light to be effectively cast using bait casting reels. Spinning reels employ a spool which is rotationally stationary during casting and a rotating bail which wraps the line onto the reel when the crank is turned. On some spinning reels, the spool oscillates axially as the bail wraps the line thereon to provide more even wrapping. The spool is oriented with its axis parallel to the axis of the rod. For casting, the bail is pivoted to a casting position which releases it from the line. During casting, the line feeds out from the open side of the reel in a quasi-helical fashion, that is, in coils, unimpeded by either the bail or inertia of the spool. For this reason, spinning reels can employ lures and lines which are much lighter that those used on bait casting reels. The helical pay-out of the line during casting introduces a twist in a cast direction to the line. When the bail wraps the line back onto the spool, a twist in an opposite retrieve direction is imparted to the line, thereby mostly compensating for the casting twist.

The spool of a spinning reel is typically mounted on the reel frame to allow rotation, retarded by an adjustable frictional drag mechanism, to allow the line to be paid out by a hooked fish, against the drag. During such pay out, no twist is imparted to the line, since the bail is prevented from rotating by a one-way ratchet mechanism. However, when the bail is rotated by turning the hand crank to reel the hooked fish in, a twist in the retrieve direction is put into the line. Over a number of successful casts in which a fish is hooked and pulls the line out against the drag, the retrieve direction line twist can mount up, thereby causing tangling problems.

Spin cast reels share some of the characteristics of spinning reels in that the spool is rotationally fixed and oriented with an axis parallel with the rod. However, the open face of the spool of a spin cast reel is covered by somewhat conically shaped cup or nose cone with a center hole through which the line extends. Spin cast reels do not employ a bail but one or more rotary line pickup members which are released for casting and which wrap the line onto the spool when retrieving a lure. Some spin cast reels employ axial oscillation of the spool to wrap the line evenly on the spool. Spin cast reels can be used with fairly light weight lures and lines and generally have the same line twist problems as spinning reels.

Drag mechanisms in fishing reels allow a fisherman to employ relatively lighter lines and rods by allowing a hooked fish to "run" with a lure, pulling out line from the reel against the drag incorporated in the reel, and eventually exhausting the fish. Most of the drag mechanisms employed in conventional fishing reel configurations involve simple friction of a moving part rotating in contact with a stationary part. Drag adjustment is made by controlling the contact force applied between the moving and stationary parts. In typical frictional relationships, a relatively higher static friction must be overcome, after which a relatively lower and constant dynamic friction is maintained when there is relative movement between the parts. It is desirable to adjust the drag to maintain a tension in the line below the rated breaking strength of the line during initial movement and continued movement of the fish.

There have been some attempts to apply fluid based drag mechanisms to fishing reels. In U.S. Pat. No. 3,034,604 to Holmes, an eccentric vane pump is incorporated within a casting type reel. A pump rotor is engaged with the spindle of the spool and urges a fluid through passages containing an adjustable orifice to control fluid resistance to rotation of the spool. Although it is conceivable that such an arrangement could function, it is mechanically complex and, thus, likely to be expensive. In U.S. Pat. No. 6,065,699 to Sacconi, the spool is geared to a so-called turbine which revolves in a chamber filled with a fluid. The arrangement is asserted to be self adjusting in that the drag is proportional to the force exerted by a hooked fish. However, there is no provision for adjustment of the drag by the fisherman.

SUMMARY OF THE INVENTION

The present invention provides an improved fishing reel which has a free, open reel casting feature similar to spinning reels but which also incorporates features to counteract line twist. In particular, the improved reel incorporates a spool which is spun about two axes during line retrieval and which has two orientations or configurations, one for casting and one for line retrieval.

An embodiment of the improved reel with dual spool spin axes includes a support housing, a rotor member rotatably mounted on the housing, a spool shroud assembly or shroud pivotally mounted on the rotor and movable between a retrieve configuration and a casting configuration, a spool rotatably mounted in the shroud assembly, and a drive transfer mechanism engaged between the housing, the rotor, and the spool whereby rotation of the rotor causes the spool to rotate about a rotor axis of the rotor and simultaneously spin about its own spool axis for line retrieval and, conversely, spinning of the spool about its spool axis during line pay-out causes the rotor to rotate about the rotor axis to counter twist in the line.

An embodiment of the reel includes a drive shaft rotatably mounted on the housing and connected through gearing to a hand crank and a drag plate mounted on the drive shaft and in a rotary shear relationship with a friction plate of the rotor. A pawl engaged with the crank gearing allows rotation of the crank only in a line retrieve direction whereby the drive shaft drag plate and rotor friction plate rotate in unison except during line pay-out when rotary shear is overcome by an adjusted level of tension in the line. In an embodiment of the reel, a viscous fluid is positioned between the drag plate and the friction plate which provides viscous shear therebetween. The viscous shear increases non-linearly as the distance between the drag plate and the friction plate is reduced by adjustment.

In an embodiment of the reel, the spool shroud is pivotally mounted in gimbal arms extending from the rotor. A shroud pivot lever is pivotally connected to the rotor and is connected to the shroud by a shroud link. A shroud return spring is engaged between the shroud pivot lever and the rotor such that retraction of the shroud pivot lever pulls the shroud to the cast position and release of the shroud pivot lever enables the shroud return spring to return the shroud to a retrieve position. A trigger shaft extends through the housing, the rotor, and the shroud pivot lever. A trigger member is pivotally connected between the housing and a rear end of the trigger shaft to enable axial movement of the trigger shaft in response to pivoting of the trigger member. A trigger hand member is secured to a front end of the trigger shaft and is sized and positioned to engage the shroud pivot lever when the trigger shaft is retracted toward the housing. The trigger member may include a trigger return spring to positively return the trigger shaft to an extended position when the trigger member is released.

In an embodiment of the reel, the trigger hand member is a spool spin gear which functions to cause the spool to spin relative to the shroud under some conditions. The trigger shaft and the spin gear are rotationally fixed, but axially movable between the normally extended position and the retracted position employed in lure casting. The shroud assembly includes one or more spool gears drivingly engaged with the spool and the spin gear whereby rotation of the rotor about the rotor axis causes the spool to spin about the spool axis or, conversely, spinning of the spool about its spool axis causes the rotor to rotate about the rotor axis. The spool gear or gears are disengaged from the spin gear when the shroud assembly is pivoted to the casting position and re-engaged therewith when the shroud assembly returns to the retrieve position. The spool shroud has a detent recess or socket which is positioned to snap onto a front end of the trigger shaft to secure the shroud assembly in the retrieve position. The trigger shaft front end is retracted from the socket when the shroud assembly is flipped to the casting position.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 4 is a view similar to FIG. 3 and shows the reel apparatus with the spool shroud assembly in the retrieve position.

FIG. 5 is a greatly enlarged fragmentary sectional view of a portion of a rotor assembly and shows a viscous liquid positioned between a friction plate and a drag plate of the rotor assembly.

DETAILED DESCRIPTION OF THE INVENTION

Figure 1:
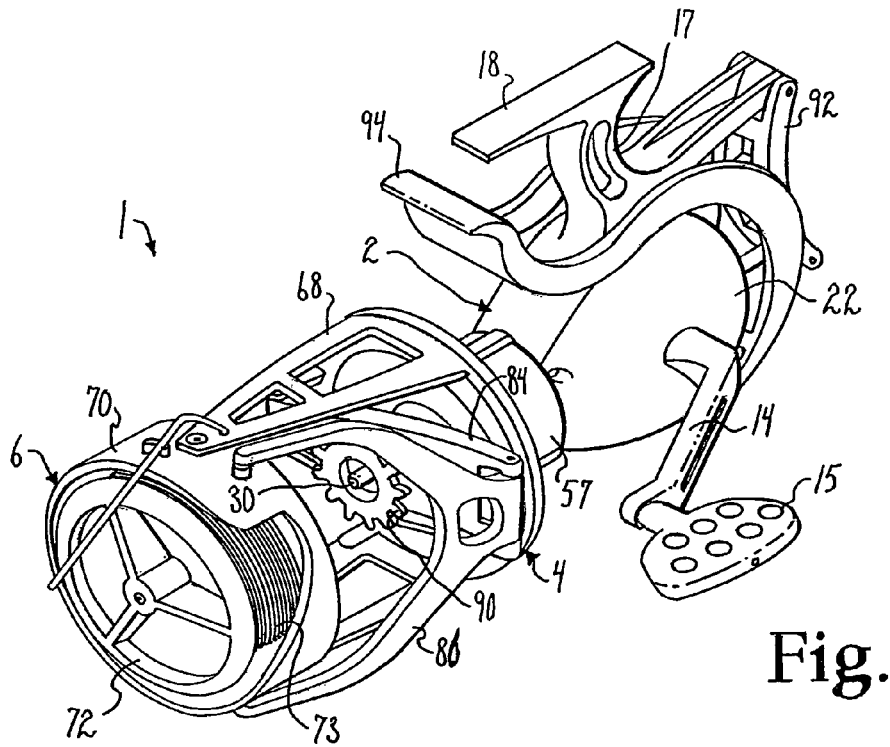
FIG. 1 is a perspective view of an embodiment of a fishing reel apparatus with dual spool spin axes according to the present invention, with a spool shroud assembly shown in a casting position.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of a fishing reel or reel apparatus with dual spool spin axes according to the present invention. The apparatus 1 generally includes a housing assembly or reel frame 2, a rotor assembly 4 rotatably mounted on the housing assembly 2, and a spool shroud assembly 6 gimbal mounted on the rotor assembly 4. The reel apparatus 1 performs the functions similar to those of conventional fishing reels, such as a spinning reel or a spin cast reel, but also incorporates mechanisms to counteract fishing line twist which is introduced into the lines of spinning and spin cast reels by the manner of casting and retrieving the line by these conventional reels.

Figure 2:
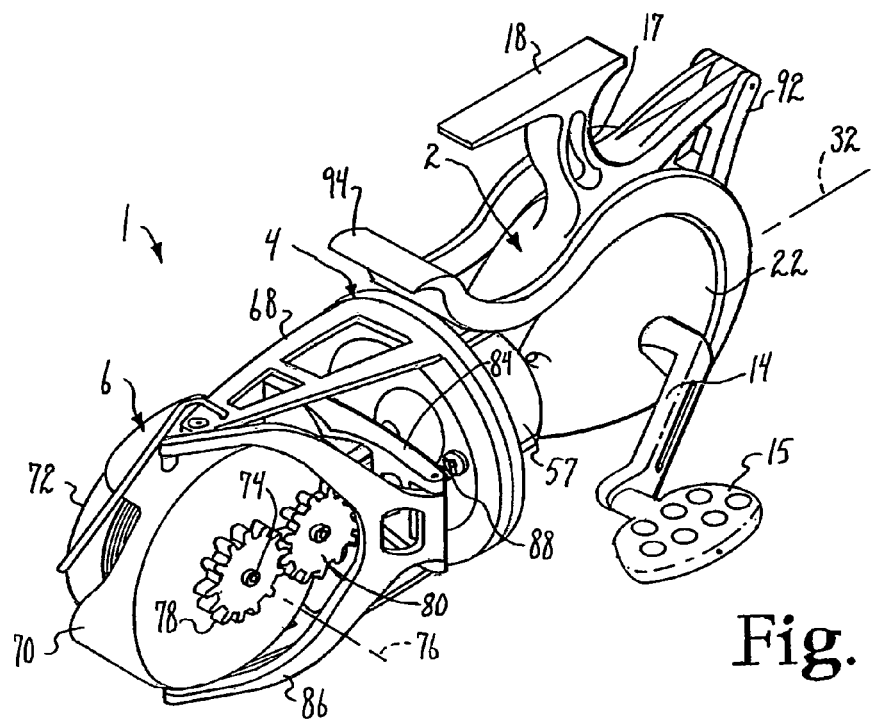
FIG. 2 is a view similar to FIG. 1 and illustrates the spool shroud assembly in a normal retrieve position.

Referring to FIGS. 1 and 2, the housing assembly or housing 2 has a crank shaft 12 (FIGS. 3 and 4) rotatably mounted in a transverse orientation therethrough. A crank arm 14 with a crank handle 15 is secured on the crank shaft 12 to rotate it. The illustrated crank shaft 12 extends from both sides of the housing 2 and is configured to enable the crank arm 14 to be secured to either end to facilitate either right or left handed operation of the reel apparatus 1. The housing 2 has a mounting strut 17 extending from an upper side thereof which terminates in a mounting foot 18. The mounting foot 18 is configured to be secured to a suitable fishing rod 20 (FIG. 3) in a conventional manner. The illustrated reel apparatus 1 is configured for mounting on a lower side of the rod 20, in the manner of a conventional spinning reel. The illustrated housing 2 is a hollow cup-like structure and is closed by a housing cover plate 22.

Figure 3:
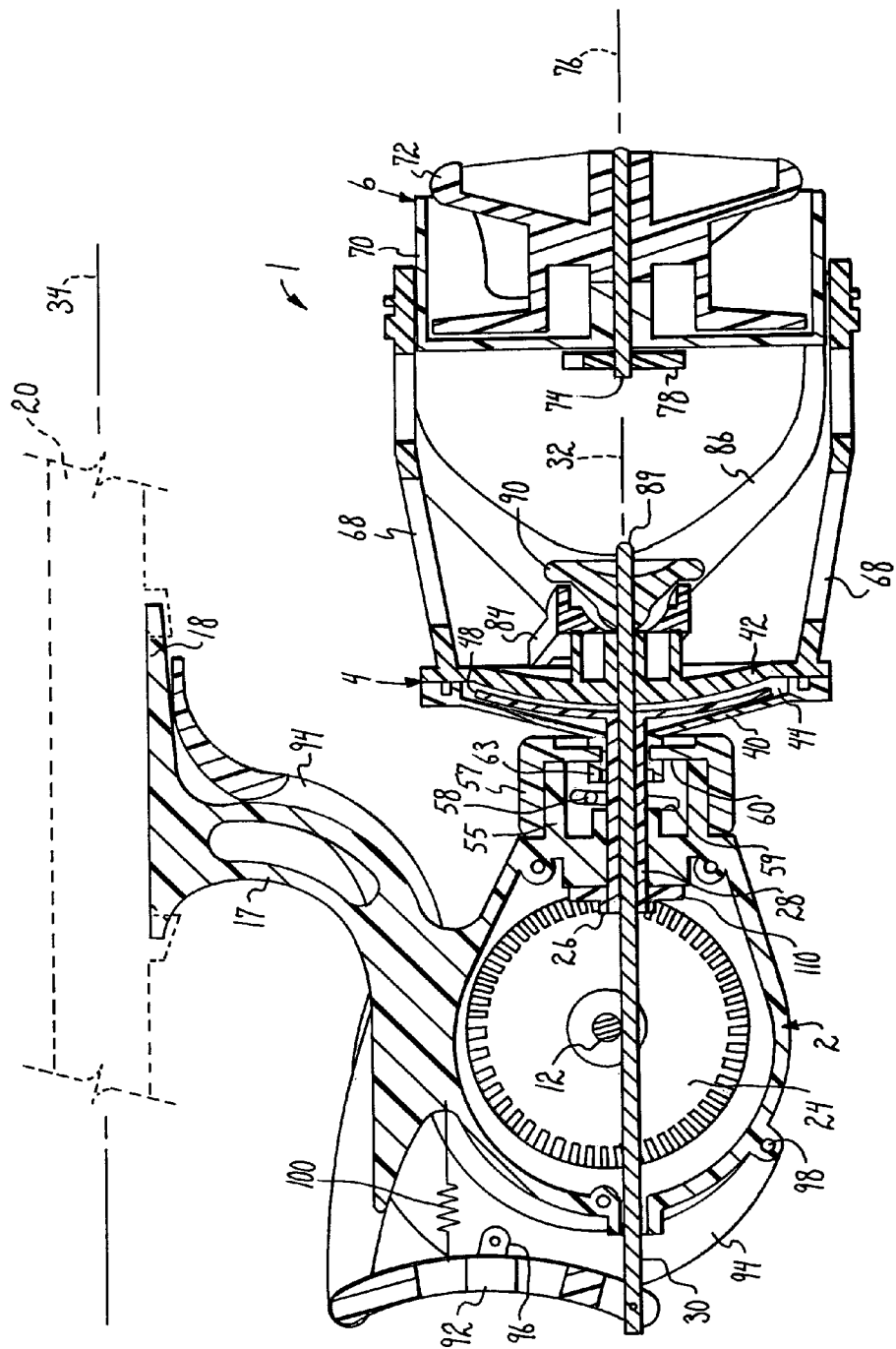
FIG. 3 is an enlarged longitudinal sectional view of the reel apparatus with the spool shroud assembly shown in the casting position.

Referring to FIGS. 3 and 4, a main crank gear 24 is secured to the crank shaft 12 for rotation by the crank arm and handle 14 and 15. The crank gear 24 meshes with a drive gear set 26 secured to a drive shaft 28 which is rotatably mounted at a front end of the housing 2. The illustrated drive shaft 28 is tubular and has a trigger rod 30 extending therethrough. The trigger rod 30 extends entirely through the housing 2 and exits a rear end thereof. The trigger rod 30 forms a rotor axis 32 about which the rotor assembly 4 and other structures of the apparatus 1 rotate. The rotor axis 32 is substantially parallel to a rod axis 34 of a handle section of the fishing rod 20.

The illustrated rotor assembly 4 includes a rear friction plate 40 having a rotor cover plate 42 sealingly secured to a front side thereof. The friction plate 40 and cover plate 42 are shaped to provide a drag chamber 44 therebetween. Fluid sealing between the illustrated friction plate 40 and cover plate 42 may be provided by means such as an O-ring seal member 46 (FIG. 5). A drag plate 48 is mounted on the drive shaft 28 and is positioned within the drag chamber 44 in a rotary shear relationship with the friction plate 40. The rotary shear relationship between could be a frictional relationship. In an embodiment of the reel apparatus 1, the shear relationship is a fluid shear relationship provided by a high viscosity fluid 50 (FIG. 5) which is sealed within the drag chamber 44.

In general, the high viscosity fluid 50 resists or retards relative movement between the friction plate 40 and the drag plate 48 by a mechanism of viscous fluid shear. The fluid shear increases in inverse proportion to the gap between the friction plate 40 and the drag plate 48. In an embodiment of the reel apparatus 1, the fluid 50 has a viscosity within a range of about 500 to 5000 centipoise, such as about 1000 centipoise. The fluid 50 may be a material such as polydimethoxy siloxane, a silicone fluid, or the like, such as Dow Corning 211 or Union Carbide 404 or an equivalent type liquid. Alternatively, a petroleum based material could be employed. It is also foreseen that a non-Newtonian type of liquid could be employed, a characteristic of which is that the level of drag caused by the fluid 50 is related to the rate of increase of the speed of relative movement between the friction plate 40 and the drag plate 48.

The illustrated housing 2 includes a forwardly extending tubular neck 55 (FIGS. 3 and 4) on which a drag adjustment nut or knob 57 is rotatably mounted relative to the rotor axis 32. The nut 57 has one or more pegs 58 extending radially inwardly therefrom which are received in helical slots 59 formed in the neck 55. Rotation of the nut 57 about the rotor axis 32 causes axial movement along the rotor axis 32. The nut 57 has a radially inwardly extending flange 60 at a front end thereof. The friction plate 40 has a tubular mounting neck 63 extending rearwardly therefrom. The neck 63 is engaged by the flange 60 which is received in a groove therein. The rotor assembly 4 is, thus, rotatably supported by cooperation of the tubular drive shaft 28 and the flange 60. The drive shaft 28 is axially fixed, such that rotation of the adjustment nut 57 causes the friction plate 40 to move axially with respect to the drag plate 48. By this means, the rotary shear relationship between the friction plate and the drag plate 48 can be conveniently adjusted. The drag adjustment nut 57 may be formed in halves which are joined in place by fasteners (not shown).

The illustrated rotor assembly 4 includes a pair of gimbal arms 68 extending forwardly from the cover plate 42. The spool shroud assembly 6 is pivotally mounted to the front ends of the arms 68. The shroud assembly 6 includes a cylindrical shroud shell or shroud 70 in which a fishing line spool member or spool 72 is rotatably mounted. The spool 72 stores a length of fishing line 73 (FIG. 1) which is wrapped helically and spirally around the spool 72. In the illustrated shroud assembly 6, a spool shaft 74 is rotatably mounted in the shroud 70 and forms a spool axis 76 of the spool 72. The spool 72 is secured to one end of the spool shaft 74 and a spool gear 78 is secured to an opposite end, outside of the shroud 70. In the illustrated shroud assembly 6, a shroud gear 80 is rotatably mounted on the shroud 70 and is meshed with the spool gear 78.

In the illustrated rotor assembly 4, a shroud lever 84 is pivotally connected to the cover plate 42 and extends diametrically across the rotor assembly 4. A shroud link member or yoke 86 is pivotally connected to an end of the shroud lever 84 and to the shroud 72 at a position radially spaced from a pivot axis (not shown) of the shroud assembly 6 on the gimbal arms 68. By this means, pivoting of the lever arm 84 causes the shroud assembly 6 to pivot relative to the gimbal arms 68. A shroud return spring 88 (diagrammatically illustrated in FIGS. 2 and 4) is engaged between the cover plate 42 and the shroud lever 84 and urges the shroud lever 84 away from the cover plate 42. This urges the shroud assembly 6 toward the retrieve position (shown in FIGS. 2 and 4) in which the spool axis 76 is approximately perpendicular to the rotor axis 32. Conversely, movement of the shroud lever 84 toward the cover plate 42 pulls the shroud assembly 6 around to the casting position (shown in FIGS. 1 and 3) in which the spool axis 76 is in, or approaches, alignment with the rotor axis 32.

The trigger rod 30 is mounted within the housing 2 for reciprocating axial movement, but is rotationally stationary. At a front end 89 of the rod 30, a shroud lever abutment is provided which engages the shroud lever 84 to pull it toward the rotor cover plate 42. In the illustrated embodiment of the reel apparatus 1, the shroud lever abutment is formed by a spin gear 90 which is secured to the front end 89 of the trigger rod 30. A rear end of the trigger rod 3 is connected through a trigger link 92 to a trigger lever 94. The illustrated trigger link 92 is connected by a crank link 96 to the trigger lever 94. The trigger lever 94 is pivotally connected to the housing 2 at a pivot joint 98.

A trigger return spring 100 (diagrammatically illustrated in FIGS. 3 and 4) is engaged between the trigger link 92 and the housing 2 and urges the trigger lever 94 to a lower position in which the trigger rod 30 is extended (FIG. 4). In the extended position of the trigger rod 30, the front end 89 is received in a socket or recess 102 formed in a side wall of the shroud 70 to positively retain the shroud assembly 6 in the retrieve position. Retraction of the trigger rod 30 retracts the end 89 from the socket 102, thereby releasing the shroud assembly 6 to pivot to the casting position (FIGS. 1 and 3).

When the trigger lever 94 is pulled toward the fishing rod 20, as during lure casting, the trigger rod 30 is retracted and pulls the spin gear 90 toward the rotor cover plate 42. This action pulls the shroud lever 84 toward the cover plate 42 and pivots the shroud assembly 6 to the casting position (FIGS. 1 and 3) with the open face of the shroud 70 to the front. The fishing line 73 is easily paid out from the spool 72 in the casting position. When the trigger lever 94 is released, the trigger rod 30 is allowed to extend, releasing the shroud lever 84 which is pivoted forward by the shroud return spring 88, thereby flipping the shroud assembly 6 back to the retrieve position (FIGS. 2 and 4).

In the retrieve position, the shroud gear 80 meshes with the spin gear 90, such that rotation of the rotor assembly 4, by cranking the crank arm 14, rides the shroud gear 80 about the stationary spin gear 90, thereby transferring rotation of the rotor assembly 4 to the shroud gear 80, the spool gear 78, the spool shaft 74, and the spool 72. By this means, rotation of the spool 72 causes the fishing line 73 to be wrapped onto the spool 72.

The illustrated reel apparatus 1 is provided with means to enable the crank arm 14, the crank shaft 12, the drive gear 26, the drive shaft 28, and the drag plate 48 to rotate only in a direction to enable the fishing line 73 to be retrieved onto the spool 72. Referring to FIG. 4, a pawl member 104 is pivotally mounted on a wall of the housing 2 and is normally urged against a pawl stop 106 by a pawl spring 108. In this position, an end of the pawl 104 engages a ratchet gear 110 which is a part of the drive gear set 26, which prevents the drive gear set 26 from rotating in a pay-out direction, opposite the retrieve direction of rotation of the rotor assembly 6 when the line 73 is retrieved onto the spool 72. In the retrieve direction, the end of the pawl 104 is shaped to slip past the ratchet gear 110, thereby enabling rotation of the rotor drive gear 26 only in the retrieve direction.

After casting if a lure is taken by a fish, the line 73 pays out from the spool 72, which spins about its spool axis 76. This rotation is transferred to the shroud gear 80, causing the rotor assembly 4 to rotate about the rotor axis 32 in the pay-out direction. Rotation of the rotor assembly 4 in the pay-out direction imparts a twist to the line 73 in the same direction. The drag plate 48 is held stationary during fish induced pay-out of the line 73 through connection of the drag plate 48 to the drive gear 26 by way of the drive shaft 28. This provides a drag on rotation of the rotor assembly 4 and pay-out of the line 73 from the spool 72 by way of the shear relationship between the friction plate 40 and the drag plate 48. When the crank arm 14 is turned in its retrieve direction, the rotation is enabled by the pawl 104, thereby rotating the rotor assembly 4 in the retrieve direction, and spinning the spool 72 about its spool axis 76 to wrap the line 73 onto the spool. Thus, during retrieval of the line 73, the spool 72 is rotated about its spool axis 76 and simultaneously about the rotor axis 32.

Rotation of the spool 72 about the rotor axis 32 during line retrieval twists the line 73 in a retrieve direction opposite that which is introduced by pay-out of the line 73 by a hooked fish, thereby substantially compensating for the pay-out direction twisting of the line. A similar twist compensation occurs between casting and retrieval of a lure. During casting, the line 73 feeds from the spool 72 in helical coils. This causes a twist to be put into the line in the pay-out direction. Since the shroud gear 80 is disengaged from the spin gear 90 in the cast position of the shroud assembly 6, pay out of the line 73 during casting does not cause rotation of the rotor assembly 4, even if the spool 72 spins. Afterwards, retrieval of the line 73 onto the spool 72 rotates the rotor assembly 4 in the retrieve direction, thereby twisting the line 73 in the retrieve direction. By these means, an accumulation of twist in the line 73 which occurs in conventional types of reels, such as spinning reels, is avoided in the apparatus 1 in situations of casting and retrieval and in line pay-out by a hooked fish and retrieval.

It is to be understood that while certain forms of the present invention have been described and illustrated herein, it is not to be limited to the specific forms or arrangement of parts described and shown.

What is claimed and desired to be secured by Letters Patent is:

1. In a fishing reel apparatus for use with a fishing rod having a rod axis and including a support housing and a fishing line spool having a spool axis and being adapted to have a fishing line wrapped thereon, the improvement comprising:
   (a) said spool being engaged with said housing in such a manner that rotation of said spool about a rotor axis extending substantially parallel to the rod axis and passing diametrically through said spool causes said spool to simultaneously rotate about said spool axis to wrap said line onto said spool.

2. An apparatus as set forth in claim 1 and including:
   (a) said spool being engaged with said housing in such a manner as to enable said spool to be oriented in a retrieve position with said spool axis substantially perpendicular to said rotor axis and alternatively in a casting position with said spool axis approaching a perpendicular relationship with the orientation of said spool axis in said retrieve position.

3. In a fishing reel apparatus including a support housing and a fishing line spool having a spool axis and being adapted to have a fishing line wrapped thereon, the improvement comprising:
   (a) said spool being engaged with said housing in such a manner that rotation of said spool about a rotor axis passing diametrically through said spool causes said spool to simultaneously rotate about said spool axis to wrap said line onto said spool;
   (b) a spin gear member mounted on said housing in alignment with said rotor axis in rotationally fixed relation to said support housing;
   (c) said spool being rotatably mounted in a spool shroud to enable rotation of said spool about said spool axis within said spool shroud, said spool having a spool gear secured thereto;
   (d) a rotor structure rotatably mounted on said support housing to enable rotation about said rotor axis;
   (e) said spool shroud being connected to said rotor structure in such a manner as to position said spool such that said rotor axis passes diametrically through said spool; and
   (f) said spool gear being drivingly engaged with said spin gear in such a manner that rotation of said rotor structure rotates said shroud and spool about said rotor axis whereby driving engagement between said spool gear and said spin gear causes said spool gear to rotate said spool about said spool axis within said shroud.

4. An apparatus as set forth in claim 3 and including:
   (a) said shroud being engaged with said rotor structure in such a manner as to enable said shroud and spool to be oriented in a retrieve position with said spool axis substantially perpendicular to said rotor axis and alternatively in a casting position with said spool axis approaching a perpendicular relationship with the orientation of said spool axis in said retrieve position; and
   (b) a trigger mechanism mounted on said support housing and linked to said shroud in such a manner as to enable selective positioning of said shroud and spool in said retrieve position or in said casting position.

5. An apparatus as set forth in claim 3 and including:
   (a) a crank member rotatably mounted on said support housing; and
   (b) said crank member being drivingly engaged with said rotor structure in such a manner that rotation of said crank member causes rotation of said rotor.

6. An apparatus as set forth in claim 3 and including:
   (a) said rotor structure having a rotor friction plate; and
   (b) a drag member mounted on said support housing in spaced relation to said rotor friction plate and operable to retard rotation of said rotor structure relative to said support housing in cooperation with said friction plate to thereby retard rotation of said spool relative to said shroud.

7. An apparatus as set forth in claim 6 and including:
   (a) a fluid positioned between said rotor friction plate and said drag member, said fluid having a composition which causes fluid drag to relative movement between said rotor friction plate and said drag member to thereby retard rotation of said rotor structure relative to said support housing and rotation of said spool relative to said shroud.

8. A fishing reel apparatus comprising:
   (a) a support housing including a mounting structure for securing said housing to a fishing rod having a rod axis;

(b) rotor structure rotatably mounted on said housing to rotate about a rotor axis substantially parallel to and spaced from said rod axis;

(c) a spool support shroud mounted on said rotor structure in such a manner as to rotate about said rotor axis when said rotor structure rotates about said rotor axis;

(d) fishing line spool rotatably mounted in said shroud for rotation about a spool axis relative to said shroud, said spool being operable to wrap a fishing line thereon and alternatively to pay out said fishing line therefrom; and (e) a rotation transfer mechanism engaged between said housing and said spool and operable to cause rotation of said spool about said spool axis and simultaneously about said rotor axis when said rotor structure rotates about said rotor axis.

9. An apparatus as set forth in claim 8 and including:
(a) a crank member rotatably mounted on said support housing; and
(b) said crank member being drivingly engaged with said rotor structure in such a manner that rotation of said crank member causes rotation of said rotor.

10. An apparatus as set forth in claim 8 and including:
(a) said shroud being engaged with said rotor structure in such a manner as to enable said shroud and spool to be selectively oriented in a retrieve position with said spool axis substantially perpendicular to said rotor axis and alternatively in a casting position with said spool axis approaching a perpendicular relationship with the orientation of said spool axis in said retrieve position.

11. An apparatus as set forth in claim 10 and including:
(a) a trigger mechanism mounted on said support housing and linked to said shroud in such a manner as to enable selective positioning of said shroud and spool in said retrieve position or in said casting position.

12. An apparatus as set forth in claim 11 wherein said trigger mechanism includes:
(a) an elongated trigger shaft mounted on said support housing and having a front end extending away from said support housing, said trigger shaft being axially movable along said rotor axis;
(b) a shroud lever pivotally mounted on said rotor structure and having said trigger shaft through;
(c) a trigger spring engaged between said shroud lever and said rotor structure and resiliently urging said shroud lever away from said support housing;
(d) a shroud link member pivotally connected between said shroud lever and said shroud;
(e) a trigger abutment on said front end of said trigger shaft and positioned to selectively engage said shroud lever;
(f) a trigger lever pivotally mounted on said support housing and pivotally connected to said trigger shaft whereby pivoting said trigger lever retracts said trigger shaft relative to said support housing to engage said trigger abutment with said shroud lever to thereby pivot said shroud lever and shroud link member to cause said shroud and spool to pivot to said casting position and releasing said trigger lever enables said trigger spring to pivot said shroud lever and said shroud link member to cause said shroud and spool to pivot to said retrieve position.

13. A fishing reel apparatus comprising:
(a) a support housing including a mounting structure for securing said housing to a fishing rod having a rod axis;
(b) rotor structure rotatably mounted on said housing to rotate about a rotor axis substantially parallel to and spaced from said rod axis;

(c) a spool support shroud mounted on said rotor structure in such a manner as to rotate about said rotor axis when said rotor structure rotates about said rotor axis;

(d) fishing line spool rotatably mounted in said shroud for rotation about a spool axis relative to said shroud, said spool being operable to wrap a fishing line thereon and alternatively to pay out said fishing line therefrom;

(e) a rotation transfer mechanism engaged between said housing and said spool and operable to cause rotation of said spool about said spool axis and simultaneously about said rotor axis when said rotor structure rotates about said rotor axis; and (f) said rotation transfer mechanism including:
(1) a spin gear mounted on said housing in alignment with said rotor axis in rotationally fixed relation to said support housing;
(2) a spool gear secured to said spool; and
(3) said spool gear being drivingly engaged with said spin gear in such a manner that rotation of said rotor structure in a rotor take-up direction rotates said shroud and spool about said rotor axis whereby driving engagement between said spool gear and said spin gear causes said spool gear to rotate said spool about said spool axis in a line take-up direction within said shroud.

14. An apparatus as set forth in claim 13 and including:
(a) a shroud gear rotatably mounted on said shroud and drivingly engaging said spool gear with said spin gear.

15. An apparatus as set forth in claim 13 wherein:
(a) said spin gear and said spool gear cooperate in such a manner that rotation of said spool about said spool axis in a line pay-out direction opposite said line take-up direction causes said rotor structure to rotate about said rotor axis in a rotor pay-out direction opposite said rotor take-up direction.

16. An apparatus as set forth in claim 15 and including:
(a) a ratchet gear rotatably mounted within said support housing to enable rotation about said rotor axis;
(b) said rotor structure including a friction plate secured thereto for rotation therewith about said rotor axis;
(c) a drive shaft secured to said ratchet gear and extending toward said friction plate;
(d) a drag plate positioned on said drive shaft in a rotary shear relationship with said friction plate;
(e) a pawl member pivotally mounted on said support housing and engaging said ratchet gear, said pawl member cooperating with said ratchet gear in such a manner as to slip relative to said ratchet gear when said ratchet gear rotates in said rotor take-up direction and to impede rotation of said ratchet gear in said rotor pay-out direction; and
(f) said ratchet gear, said pawl member, said friction plate, and said drag plate cooperating in such a manner that rotation of said drive shaft in said rotor take-up direction enables said friction plate and said drag plate to rotate in substantial unison and rotation of said friction plate in said rotor pay-out direction causes said pawl to impede rotation of said ratchet gear and said drag plate in said rotor pay-out direction, thereby enabling said drag plate to retard rotation of said friction plate in said rotor pay-out direction.

17. An apparatus as set forth in claim 15 and including:
(a) a viscous fluid positioned between said friction plate and said drag plate, said fluid having a composition which causes fluid shear drag between said friction plate and said drag plate thereby retarding relative motion therebetween and thereby retarding rotation of said rotor structure in said rotor pay-out direction relative to said support housing and rotation of said spool relative to said shroud.

18. An apparatus as set forth in claim 15 and including:
(a) a drag plate cooperating with a friction plate and a drag adjustment member mounted on said support housing and engaging said rotor structure in such a manner as to enable selective adjustment of said shear relationship between said friction plate and said drag plate by operation of said drag adjustment member.

19. A fishing reel apparatus comprising:
(a) a support housing including a mounting structure for securing said housing to a fishing rod having a rod axis;
(b) rotor structure rotatably mounted on said housing to rotate about a rotor axis substantially parallel to and spaced from said rod axis, said rotor structure including a rotor friction plate;
(c) a spool support shroud mounted on said rotor structure in such a manner as to rotate about said rotor axis therewith;
(d) fishing line spool rotatably mounted on said shroud for rotation about a spool axis relative to said shroud, said spool being operable to wrap a fishing line thereon and alternatively to pay out said fishing line therefrom;
(e) a rotation transfer mechanism engaged between said housing and said spool and operable to cause rotation of said spool about said spool axis and simultaneously about said rotor axis when said rotor structure rotates about said rotor axis;
(f) said shroud being engaged with said rotor structure in such a manner as to enable said shroud and spool to be selectively oriented in a retrieve position with said spool axis substantially perpendicular to said rotor axis and alternatively in a casting position with said spool axis approaching a perpendicular relationship with the orientation of said spool axis in said retrieve position;
(g) a drag member mounted on said support housing in a rotary shear relationship with said rotor friction plate and operable to retard rotation of said rotor structure relative to said drag member to thereby retard rotation of said spool relative to said shroud; and
(h) a viscous fluid positioned between said friction plate and said drag member, said fluid having a composition which causes fluid shear drag between said friction plate and said drag member thereby retarding relative motion therebetween.

20. An apparatus as set forth in claim 19 and including:
(a) a trigger mechanism mounted on said housing and linked to said shroud in such a manner as to enable selective positioning of said shroud and spool in said retrieve position or in said casting position.

21. An apparatus as set forth in claim 20 wherein said trigger mechanism includes:
(a) an elongated trigger shaft mounted on said support housing and having a front end extending away from said support housing, said trigger shaft being axially movable along said rotor axis;
(b) a shroud lever pivotally mounted on said rotor structure and having said trigger shaft through;
(c) a trigger spring engaged between said shroud lever and said rotor structure and resiliently urging said shroud lever away from said support housing;
(d) a shroud link member pivotally connected between said shroud lever and said shroud;
(e) a trigger abutment on said front end of said trigger shaft and positioned to selectively engage said shroud lever;
(f) a trigger lever pivotally mounted on said support housing and pivotally connected to said trigger shaft whereby pivoting said trigger lever retracts said trigger shaft relative to said support housing to engage said trigger abutment with said shroud lever to thereby pivot said shroud lever and shroud link member to cause said shroud and spool to pivot to said casting position and releasing said trigger lever enables said trigger spring to pivot said shroud lever and said shroud link member to cause said shroud and spool to pivot to said retrieve position.

22. An apparatus as set forth in claim 19 and including:
(a) a drag adjustment member mounted on said support housing and engaging said rotor structure in such a manner as to enable selective adjustment of said fluid shear drag between said drag member and said friction plate.

23. An apparatus as set forth in claim 19 and including:
(a) a crank member rotatably mounted on said support housing and being drivingly engaged with said rotor structure in such a manner that rotation of said crank member causes rotation of said rotor about said rotor axis.

24. A fishing reel apparatus comprising:
(a) a support housing including a mounting structure for securing said housing to a fishing rod having a rod axis;
(b) rotor structure rotatably mounted on said housing to rotate about a rotor axis substantially parallel to and spaced from said rod axis, said rotor structure including a rotor friction plate;
(c) a spool support shroud mounted on said rotor structure in such a manner as to rotate about said rotor axis therewith;
(d) fishing line spool rotatably mounted on said shroud for rotation about a spool axis relative to said shroud, said spool being operable to wrap a fishing line thereon and alternatively to pay out said fishing line therefrom;
(e) a rotation transfer mechanism engaged between said housing and said spool and operable to cause rotation of said spool about said spool axis and simultaneously about said rotor axis when said rotor structure rotates about said rotor axis;
(f) said shroud being engaged with said rotor structure in such a manner as to enable said shroud and spool to be selectively oriented in a retrieve position with said spool axis substantially perpendicular to said rotor axis and alternatively in a casting position with said spool axis approaching a perpendicular relationship with the orientation of said spool axis in said retrieve position;
(g) a drag member mounted on said support housing in a rotary shear relationship with said rotor friction plate and operable to retard rotation of said rotor structure relative to said drag member to thereby retard rotation of said spool relative to said shroud;
(h) a viscous fluid positioned between said friction plate and said drag member, said fluid having a composition which causes fluid shear drag between said friction plate and said drag member thereby retarding relative motion therebetween; and
(i) said rotation transfer mechanism including:
(1) a spin gear mounted on said on said rotor axis in rotationally fixed relation to said support housing;
(2) a spool gear secured to said spool; and
(3) said spool gear being drivingly engaged with said spin gear in such a manner that rotation of said rotor structure in a rotor take-up direction rotates said shroud and spool about said rotor axis whereby driving engagement between said spool gear and said spin gear causes said spool gear to rotate said spool about said spool axis in a line take-up direction within said shroud.

25. An apparatus as set forth in claim 24 wherein:
(a) said spin gear and said spool gear cooperate in such a manner that rotation of said spool about said spool axis in a line pay-out direction opposite said line take-up direction causes said rotor structure to rotate about said rotor axis in a rotor pay-out direction opposite said rotor take-up direction.

26. An apparatus as set forth in claim 25 and including:
(a) a ratchet gear rotatably mounted within said support housing to enable rotation about said rotor axis;
(b) a drive shaft secured to said ratchet gear and extending toward said rotor friction plate;
(c) said drag member including a drag plate positioned on said drive shaft;
(d) a pawl pivotally mounted on said support housing and engaging said ratchet gear, said pawl cooperating with said ratchet gear to slip relative to said ratchet gear when said ratchet gear rotates in said rotor take-up direction and to impede rotation of said ratchet gear in said rotor pay-out direction; and
(e) said ratchet gear, said pawl, said friction plate, and said drag plate cooperating in such a manner that rotation of said drive shaft in said rotor take-up direction enables said friction plate and said drag plate to rotate in substantial unison and rotation of said friction plate in said rotor pay-out direction causes said pawl to impede rotation of said ratchet gear and said drag plate in said rotor pay-out direction, thereby enabling said drag plate to retard rotation of said friction plate in said rotor pay-out direction to thereby retard rotation of said spool in said payout direction.

27. In a fishing reel apparatus for use with a fishing rod with a rod axis and including a fishing line spool rotatably mounted on a reel frame to enable payout of fishing line from said spool thereby twisting said line in a payout direction and to enable rotation of said spool about a spool axis to retrieve said line onto said spool, the improvement comprising:
(a) said spool being engaged with said frame in such a manner that retrieval of said line onto said spool causes rotation of said spool about said spool axis and simultaneous rotation of said spool about a rotor axis substantially parallel to the rod axis thereby twisting said line in a retrieve direction opposite said payout direction to thereby substantially cancel line twist in said payout direction.

28. An apparatus as set forth in claim 27 and including a spool drag mechanism engaged between said spool and said reel frame and comprising:
(a) a drag member engaged with said reel frame;
(b) a friction plate engaged with said spool in such a manner as to rotate in response to selected rotation of said spool, said friction plate member being positioned in spaced relation to said drag member;
(c) a viscous fluid positioned between said drag member and said friction plate, said fluid producing fluid shear drag between said drag member and said friction plate in response to relative movement therebetween, said fluid shear drag being related to spacing between said drag member and said friction plate; and
(d) a drag adjustment member engaged between said friction plate and said drag member and operable to selectively adjust said spacing therebetween to thereby adjust said fluid shear drag.

* * * * *